June 9, 1936.  E. G. ROEHM  2,043,420
BROACHING MACHINE
Filed Aug. 28, 1934  7 Sheets-Sheet 1

Inventor
ERWIN G. ROEHM

By O. K. Parsons
Attorney

June 9, 1936.  E. G. ROEHM  2,043,420
BROACHING MACHINE
Filed Aug. 28, 1934     7 Sheets-Sheet 3

Inventor
ERWIN G. ROEHM
By A. K. Parsons
Attorney

June 9, 1936.  E. G. ROEHM  2,043,420
BROACHING MACHINE
Filed Aug. 28, 1934   7 Sheets-Sheet 4
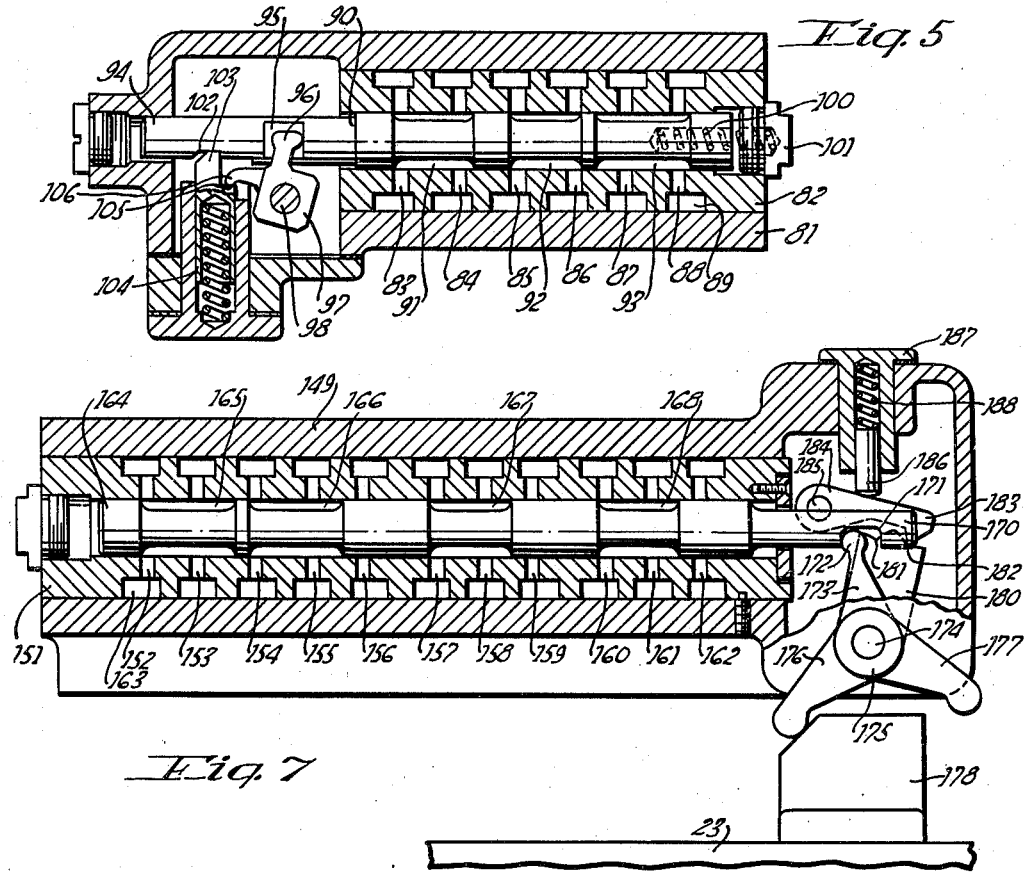
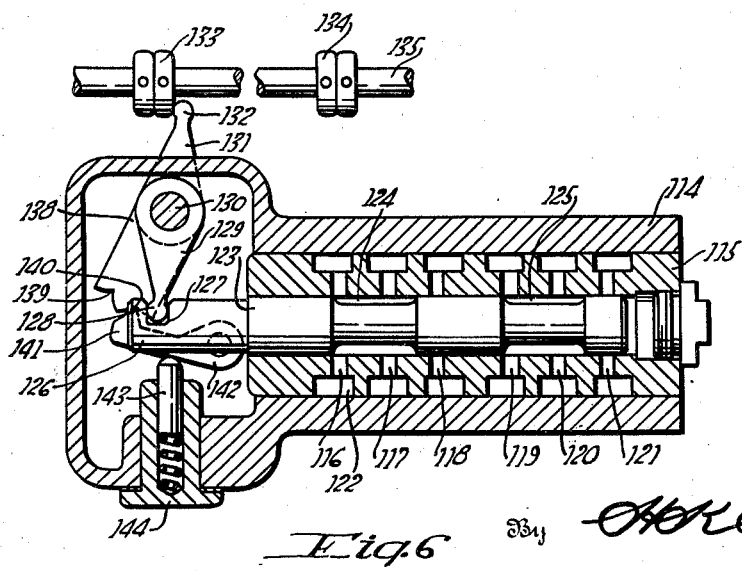
Inventor
ERWIN G. ROEHM
By A. H. Parsons
Attorney June 9, 1936.  E. G. ROEHM  2,043,420
BROACHING MACHINE
Filed Aug. 28, 1934  7 Sheets-Sheet 5

Inventor
ERWIN G. ROEHM
By A. K. Parsons
Attorney

June 9, 1936.　　　　E. G. ROEHM　　　　2,043,420
BROACHING MACHINE
Filed Aug. 28, 1934　　　7 Sheets-Sheet 7
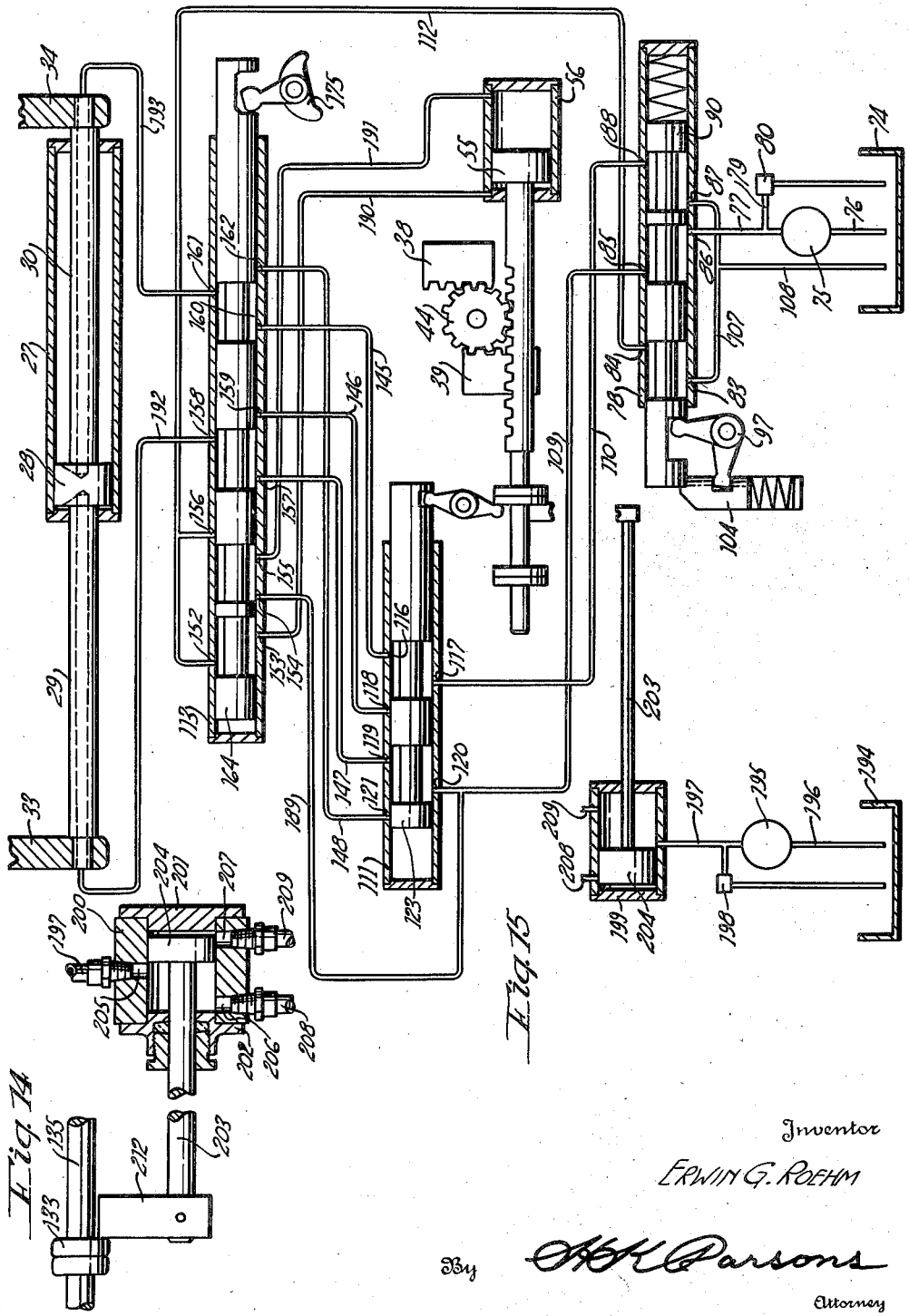
Inventor
ERWIN G. ROEHM
By　AHKParsons
　　　Attorney Patented June 9, 1936

2,043,420

UNITED STATES PATENT OFFICE 2,043,420

BROACHING MACHINE

Erwin G. Roehm, Norwood, Ohio, assignor to The Cincinnati Milling Machine Co., Cincinnati, Ohio, a corporation of Ohio Application August 28, 1934, Serial No. 741,821

20 Claims. (Cl. 90—33)

This invention relates to improvements in machine tools and particularly to improvements in broaching machines of the surface type.

The principal object of the invention is the provision of a broaching machine in which the idle time of the machine is reduced to an absolute minimum.

Another object of the invention is the provision of a mechanism as described in the preceding paragraph in which a plurality of broaching tools are employed for alternate use for thereby substantially, continuously producing articles by the broaching method.

A further object of the invention is the provision of a simplified actuating and control mechanism for effecting the operation of the broaching tools whereby the mechanism employed in the complete machine is reduced to an absolute minimum for maximum production.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 5 is a sectional view through the starting and stopping valve as seen through line 5—5 on Figure 3.

Figure 6 is a sectional view through the valve operated and controlled by the work tables as seen from line 6—6 on Figure 3.

Figure 7 is a sectional view through the control valve controlled and operated by the broach ram as seen from line 7—7 on Figure 2.

Figure 14 is a sectional view through the coolant supply mechanism as seen from line 14—14 on Figure 3.

Figure 15 is a diagrammatic view illustrating the hydraulic circuits involved in this invention.

Throughout the several views of the drawings similar reference characters are employed to denote the same or similar parts.

As mentioned above, this invention contemplates a broaching machine in which the idle time is reduced to an absolute minimum and therefore results in a maximum production. In general, this maximum production is accomplished by effecting a cutting or broaching of the work while the ram is traveling through both strokes, that is, its heretofore normal cutting stroke and idle or return stroke. To accomplish this result a plurality of work supports are therefore provided, one being used during the movement of the ram in one direction and the other during the movement of the ram in the other direction.

Figure 3:
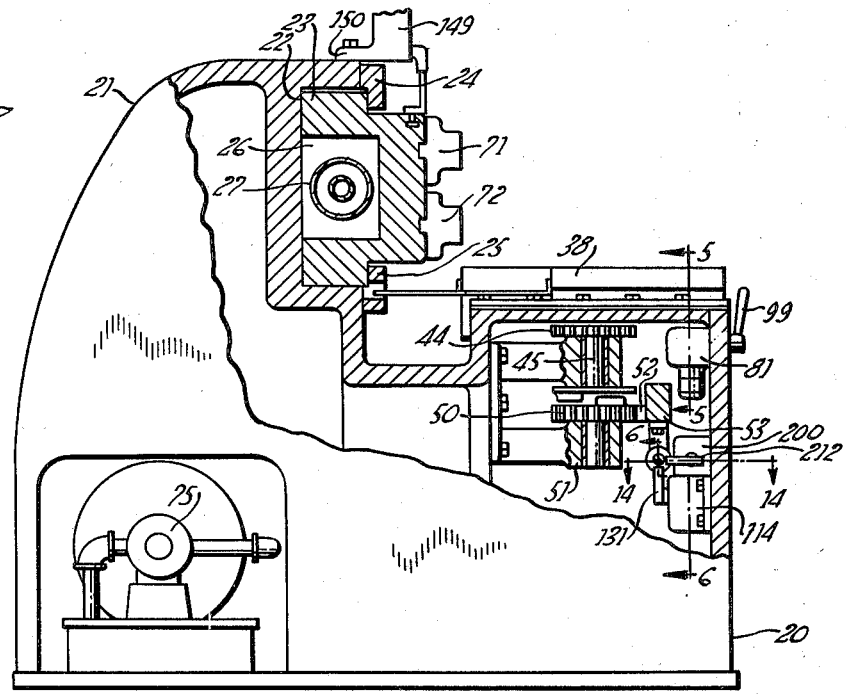
Figure 3 is a side elevational view of the machine shown in Figure 1 with certain parts broken away and shown in cross section to more clearly illustrate the construction.

Specifically, the machine or broach of this invention comprises a bed 20 having rising therefrom a column 21, see Figure 3. The column extends the length of the bed and has formed therein a guideway 22 in which is disposed a broach ram 23. The ram 23 is held to its guide way 22 by a pair of gibs 24 and 25. The ram 23 is substantially U-shaped in cross section to provide a hollow interior 26 in which is disposed the cylinder 27 being secured to the ram in any suitable or desirable manner.

Figure 1:
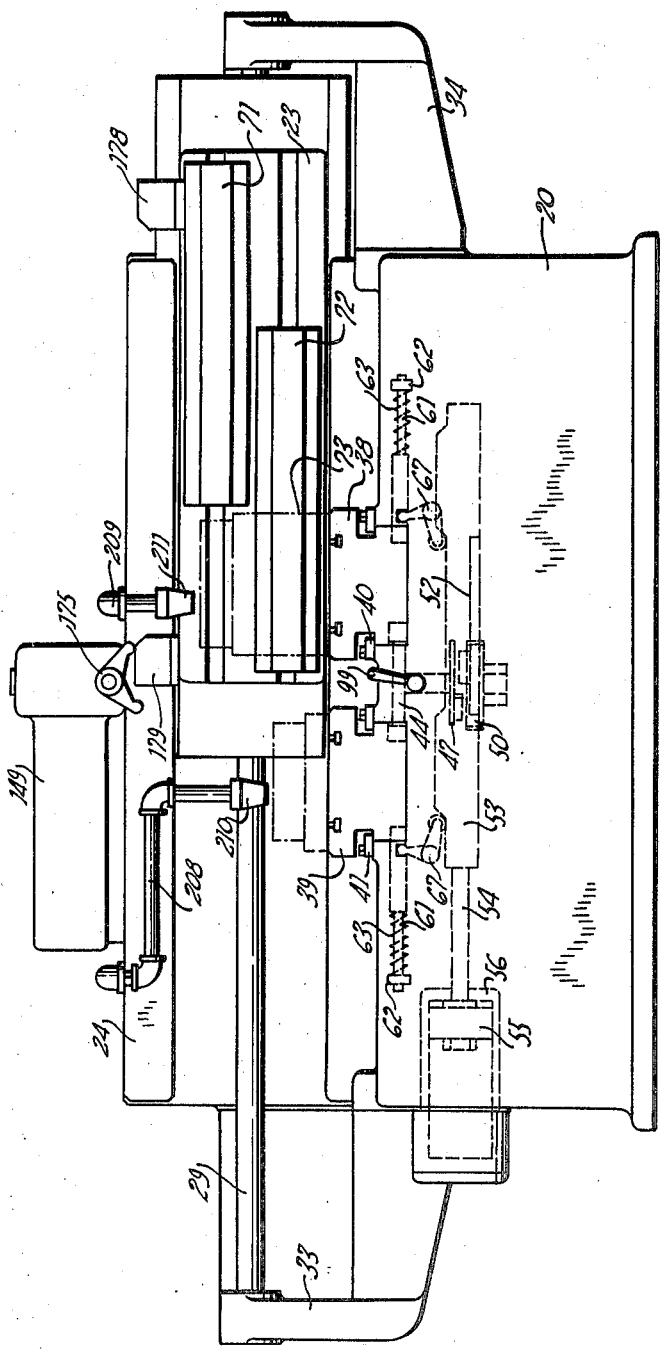
Figure 1 is a front elevation of a machine embodying improvements of this invention.
Figure 2:
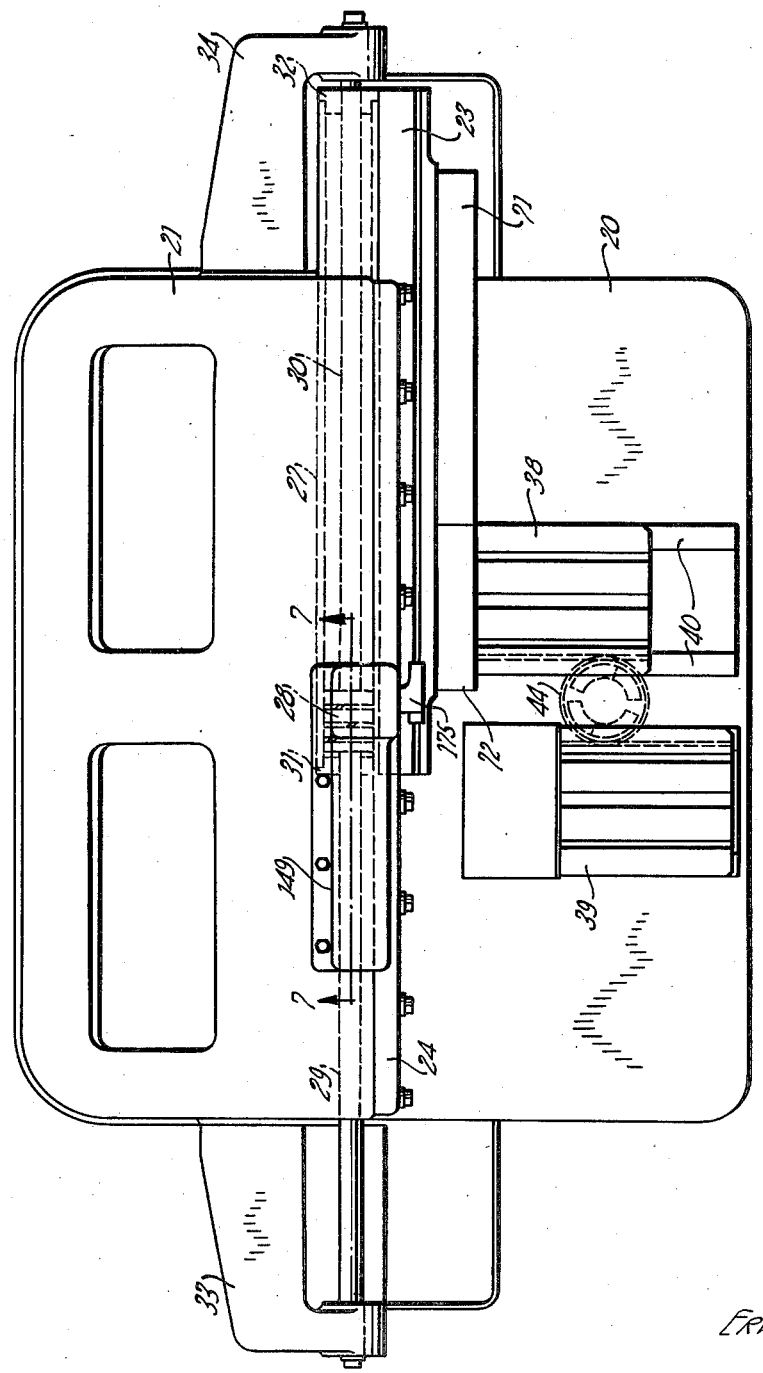
Figure 2 is a top plan view of the machine shown in Figure 1.

Within the cylinder is a piston 28 having projecting from each side thereof the hollow piston rods 29 and 30. The piston rods 29 and 30 respectively pass through cylinder heads 31 and 32, each carrying a stuffing box to prevent the escape of hydraulic pressure or the hydraulic medium within the cylinders as will later be made clear. The outer ends of the piston rods 29 and 30 are respectively anchored or secured in arms or brackets 33 and 34, in turn secured to the sides of the column and projecting therefrom. The hydraulic circuit and mechanism for actuating the piston 28 and therefore the broach ram 23 is shown in Figure 15 and will be described in detail later. As seen in Figures 1, 2, 3 and 4, the bed 20 is provided with an upper plate 35 in which is provided a pair of guideways receiving guide tongues 36 and 37 respectively projecting from work supporting tables 38 and 39. Each of the tables is held to its guideway by a pair of gibs 40 and 41. The tables 38 and 39 are arranged relative to one another as shown in Figure 2 whereby when one table is at its inner or cutting position the other is at its outer or retracted loading position. In order to keep the tables in line with one another and for simultaneously shifting the tables from one position to the other they have respectively secured to them racks 42 and 43 meshing with a rack gear 44 at diametrical points. The gear 44 is keyed or otherwise secured to a shaft 45, see Figure 3, rotatably mounted in a suitable bearing 46, see Figure 4. Below the bearing 46 the shaft 45 has further keyed or otherwise secured thereto a plate 47 having projecting from one face thereof one or more lugs 48 adapted to be engaged by similar lugs 49 extending upwardly from a gear 50. The gear 50 is rotatably journaled in a bearing 51 projecting from an inner wall of the bed 20. The lugs 48 and 49 are in effect clutch teeth whereby motion imparted to the gear 50 is transmitted to the gear 44 for shifting the work supporting tables 38 and 39 through the racks 42 and 43.

In order to rotate the gear 50 it has meshing therewith a rack 52 secured to a cam plate 53. Projecting from one end of the cam plate 53 is a piston rod 54 carrying at its outer end a piston 55 enclosed within a suitable cylinder 56 supported in any desirable manner by the bed 20. The hydraulic means for actuating the piston 55, and therefore the cam bar 53, is shown diagrammatically in Figure 15 and will be described in detail later.

The tables 38 and 39 are normally locked in their operative positions, whether that position is the inner cutting position or the outer loading position. For this purpose each slide is provided with a pair of sockets 57 and 58, the former being utilized when the work tables are in their outer loading position, while the latter is employed when the tables are at their inner cutting position. Cooperating with the sockets of the table 39 is a plunger 59, while cooperating with the sockets in the table 38 is a plunger 60. Each plunger is mounted for sliding movement in suitable bearings provided by the table plate 35 and each plunger has projecting therefrom a reduced portion 61 which is slidable through a lug 62 associated with the bed 20. Disclosed between the table lugs 62 and the shoulder on the plungers formed by the reduced portion 61 and encircling said reduced portion 61 are springs 63 which yieldably shift the plungers to their locking position as shown in the drawings. In order to retract the locking plungers against the resistance of their respective spring 63, the said plungers are each provided with a notch 64 receiving the ball end 65 of a bell crank 66 pivotally mounted at 67 within the bed 20. The bell cranks 66 are each provided at their other end with a roller 68 adapted to be engaged respectively by similar cam surfaces 69 and 70 on the cam bar 53, the cam faces 69 being utilized for retracting the plungers from the table sockets 57 to permit a shifting of the tables to their cutting positions while the cam faces 70 retract the plungers from the sockets 58 to permit a reciprocation of the tables to their loading position.

In order to operate successively on work pieces on the tables the broach ram 23 has secured thereto a pair of broaching tools 71 and 72, the broaching tool 71 being adapted to operate on the work on the table 38, while the broaching tool 72 operates on the work on the table 39. In order to bring the work on the table 38 into proper proximity with the broaching tool 71 the said table has secured thereto a raising block shown in Figure 1 at 73 in phantom lines.

From the foregoing it will be noted that there has been provided a broaching machine in which the broaching ram is provided with a pair of broaching tools, one operating to effect a broaching cut, while traveling in one direction, while the other operates to effect a broaching cut when traveling in the other direction.

It will also be noted that there has been provided a pair of work supporting tables, one for each of the broaching rams and respectively employed for presenting a work piece to the different broaching tools.

The mechanism for effecting and controlling the operation of the broach ram and work tables is shown in Figure 15 and will now be described. During the description of the hydraulic circuit the various control valves will be described in detail as they are encountered and reference will be made to the various detailed views of such valves. Accordingly, there is provided, preferably within the bed of the machine, a sump or tank 74 adapted to contain the medium, preferably oil, utilized in the hydraulic circuit. Disposed within the machine or adjacent thereto, see Figure 3, is a motor and pump unit 75 having extending from one side thereof a suction pipe 76 which terminates in the tank 74. From the other side of the pump is the discharge or pressure pipe 77 terminating in the start and stop valve mechanism indicated in general in Figure 15 by the reference numeral 78. A branch pipe or conduit 79 extends from the pressure pipe 77 and terminates in the tank 74 and has therein a relief valve 80 which is utilized for establishing the pressure in the system. The starting and stopping valve 78 is shown structurally in Figure 5 and as there shown comprises a valve casing 81 secured in any desirable manner to the inner surface of the front wall of the bed 20. Pressed into the casing 81 is a valve bushing 82 having formed therethrough a plurality of sets of radial ports 83, 84, 85, 86, 87 and 88, each set of ports being encircled by a similar circumferential groove 89 formed in the exterior of the bushing 82. Disposed within the bore in the bushing 82 is a valve member 90 having formed thereon a plurality of piston portions forming between them reduced portions or cannelures 91, 92 and 93 adapted to connect the radial ports in different combinations, depending upon the position of the valve member.

The valve member 90 has two operative positions, one as shown in Figures 5 and 15 and the other to the left of this position. In order to shift the valve member it is provided with a stem 94 having formed therein a notch or slide 95 receiving ball end 96 of the arm or finger 97. The arm 97 is secured to a shaft 98 which projects outwardly through the casing 81 and bed wall to receive a handle 99. This movement of the valve member 90 is to the right and comprises a spring 100 abutting on its inner end with the end of the valve member and on its outer end with the base of a spring guard 101 secured to the valve block 81. In order to hold the valve member in this position the valve stem 94 is provided with a second notch 102 receiving the nose 103 of a spring pressed detent or plunger 104. The plunger 104 just behind the nose 103 is provided with a shoulder 105 adapted to be engaged by a finger 106 projecting from the arm 97 and overlying the said shoulder 105. It will be noted that the notch or slot 95 is somewhat larger than the ball end 96 of the arm 97, thereby providing a certain amount of lost motion. This lost motion is utilized for retracting the locking plunger 104, thereby permitting the spring 100 to shift the valve member 90 from its starting or running position to its stop position. At the same time, should the spring be insufficient for shifting the valve member to its stop position the arm 97 may be utilized through the medium of the handle 99 for shifting the valve.

By reference to Figure 15 it will be noted that the ports 86 of the bushing 82 have connected therewith the end of the pressure pipe or conduit 77, while the ports 83 and 87 have respectively connected therewith pipes or conduits which terminate in a pipe or conduit 107, in turn emptying into a pipe or conduit 108 that terminates in the sump or tank 74. The ports 85 and 88 have respectively connected therewith one end of a pipe or conduit 109 and 110 which terminate at their other ends in the valve mechanism indicated in general in Figure 15 by the reference numeral 111. The remaining bushing ports 84 have connected therewith one end of a pipe or conduit 112 which terminates at its other end in valve mechanism indicated in general in Figure 15 by the reference numeral 113.

The valve mechanism 111 is shown structurally in Figure 6 and may be termed the reversing valve for the broaching ram, although it is under the control and operated by the table actuating mechanism. As seen in Figure 6, the valve mechanism 111 comprises a valve casing 114, which similar to the valve casing 81 is secured to the inner surface of the forward wall of the bed 20, see Figure 3. Pressed into the valve casing 114 is a valve bushing 115 having formed therethrough a plurality of sets of radial ports 116, 117, 118, 119, 120 and 121, each set of ports being encircled by a similar circumferential groove 122 formed in the exterior of the bushing 115. Disposed within the bore in the valve bushing 115 is a valve member 123 having formed thereon a plurality of piston portions forming therebetween reduced portions or cannelures 124 and 125. The reduced portions or cannelures of the valve member 123 are adapted to connect the bushing ports in different combinations, depending upon the position of the valve relative thereto.

Figure 4:
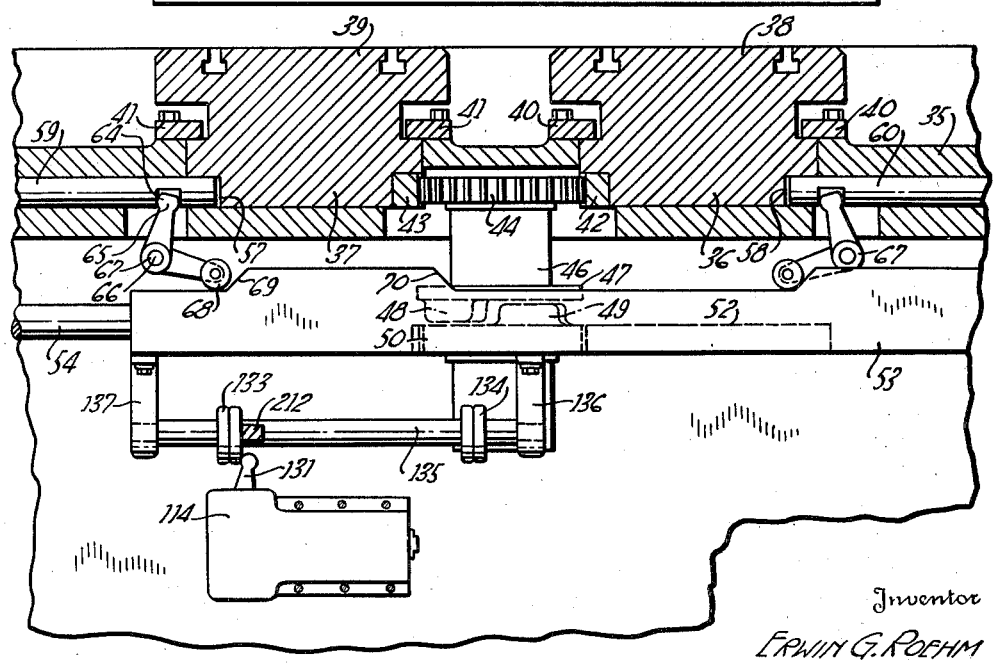
Figure 4 is a fragmentary sectional view through one form of table actuating and clamping mechanism.

The valve member 123 has two positions, the one as shown in Figures 6 and 15 and the second a position to the right thereto. In order to shift the valve member 123 it has projecting therefrom a valve stem 126 in which is formed a transverse slot or notch 127. Received in the slot or notch 127 is the ball end 128 of a valve shifter arm 129, keyed or otherwise secured to an oscillatable shaft 130 journaled in the walls of the valve casing 114. The shaft 127 projects beyond one of the casing walls and to said projection is secured a lever 131 having its end 132 disposed in the space between shifter dogs 133 and 134. The dogs 133 and 134 are here shown as collars fastened in any desirable manner to a rod 135. As seen in Figure 4, the rod 135 is supported by a pair of brackets 136 and 137 secured to and depending from the underside of the cam bar 53. From this it will be seen that the valve member 123 is shifted to its opposite operative positions after each shifting of the work tables 38 and 39, and as will later be made clear this shifting of the valve member 123 initiates the movement of the broach ram 23.

In order to determine the operative position of the valve member 123 the shaft 130 within the casing 114 has pinned or otherwise secured to it a plate 138 having formed therein a pair of notches 139 and 140 which are adapted to receive the tapered nose 141 of a detent 142. The detent 142 is pivotally mounted to one wall of the casing 114 and actuated about its pivot to maintain the nose 141 in engagement with the plate 138 by a spring pressed plunger 143. The plunger 143 is carried in a suitable holder 144 let into the lower wall of the casing 114.

By reference to Figure 15 it will be seen that ports 117 and 120 of the bushing 115 have respectively connected therewith the other ends of pipes or conduits 110 and 109. The remaining four ports 116, 118, 119 and 121 have respectively connected therewith one end of pipes or conduits 145, 146, 147 and 148 all of which terminate at their other ends in the valve mechanism 113.

The valve mechanism 113 is shown structurally in Figure 7, and as there shown, comprises a valve casing 149 from which projects a flange 150 for suitable bolts or cap screws in order to secure the same to the upper surface of the column 21. Pressed into the casing 149 is a valve bushing 151 having formed therethrough a plurality of sets of radial ports 152, 153, 154, 155, 156, 157, 158, 159, 160, 161 and 162, each set of ports being encircled by a similar circumferential groove 163 formed in the exterior of the bushing 151. Disposed within the bore in the bushing 151 is a valve member 164 having formed thereon a plurality of piston portions forming between them reduced portions or cannelures 165, 166, 167 and 168 which are adapted to connect the sets of radial ports in different combinations, depending upon the position of the valve member 164.

The valve member 164 has two operative positions, one as shown in Figures 7 and 15, and a second position to the right of that shown. In order to shift the valve member 164 it has projecting from one end thereof a valve stem 170 in which is formed a transverse notch or slot 171 receiving therein the ball end 172 of a shifter arm 173. The arm 173 is keyed or otherwise secured to an oscillatable shaft 174 oscillatably journaled in the walls of the valve casing 149 and beyond the forward wall thereof the said shaft projects. Keyed or otherwise secured to the said projecting portion of the shaft 174 is a flipper dog 175 having integral therewith laterally offset wings 176 and 177. The wings 176 and 177 are respectively adapted to be engaged by dogs 178 and 179 adjustably secured to the upper surface of the broach ram 23. From the foregoing it will be noted that the valve member 164 is thrown at each end of the broach ram stroke, and as will later be made clear, initiates operation of the work tables shifting piston.

In order to determine the operative positions of the valve member 164 and to complete the shifting thereof there is provided a load and fire mechanism which comprises a plate member 180, keyed or otherwise secured to the oscillatable shaft 174 and disposed within the casing 149. The plate 180 is provided with a pair of notches 181 and 182 between which is a lug 183 having the sides thereof extending from the apex of the lug to the notches 181 and 182 which are formed to act as cam faces. Cooperating with the plate 180 is a detent or firing dog 184 pivotally mounted at 185 within the casing 149. Engaging the rear surface of the dog 184 is a spring pressed plunger 186. The plunger 186 is mounted in a socket in a carrier 187 in which is also disposed a spring 188 contacting on one end with the plunger and on the other end with the base of the socket.

The operation of the valve shifting mechanism just described is as follows: It will be noted that there is lost motion between the walls of the slot 171 in the valve stem and the ball end 172 of the shifter arm 173. As the broach ram reaches the end of its stroke, one of the dogs thereon engages this flipper for oscillating the shaft 174. This oscillation first takes up the lost motion above referred to and at the same time through one of the faces on the plate 180 actuates the firing dog 184 upwardly until the apex 183 is reached, at this time compressing or loading the spring 188 and therefore the dog 184. As soon as the apex between the cam faces is passed the spring 188 expands or fires, thereby through the dog 184 and other cam face completes the shifting of the valve member 164.

As seen in Figure 15, the ports 160, 159, 157, and 162 of the bushing 151 have respectively connected therewith the other terminus of the pipes or conduits 145, 146, 147, and 148, extending from the valve mechanism 111. The ports 154 have connected therewith one end of a pipe or conduit 189 which has its other end connected to the pressure pipe or conduit 109, while the ports 153 and 155 have respectively connected therewith pipes or conduits 190 and 191 respectively terminating at the left and right hand ends of the tables actuating cylinder 56. The ports 152 and 156 have respectively connected therewith branch discharge conduits emptying into the pipe or conduit 112 which extends from the starting and stopping valve mechanism 78. The remaining ports 158 and 161 have respectively connected therewith one end of pipes or conduits 192 and 193 respectively terminating at the outer ends of hollow piston rods 29 and 30 for thereby delivering the pressure medium to the left and right hand end of the broach ram cylinder 27. The operation of the machine through one complete cycle is as follows and assuming the parts to be substantially in the positions shown in the drawings:

It will be noted that the starting and stopping valve member 190 has been shifted to its right hand position and latched in this position by the spring pressed latch 103. At this time the pump pressure conduit 177 is connected with the pipe or conduit 109. With the valve mechanism 113 in the position shown the pressure in pipe 109, and therefore pipe or conduit 189, is connected with the pipe or conduit 190 and the tables actuating cylinder 56 for shifting the piston 55 therein to the left. This movement of the piston places the work tables 39 and 38 in the positions shown in Figure 2, that is, with the table 39 in a retracted position to have an unfinished work piece secured thereto and table 38 in a forward or cutting position. As soon as the tables are properly positioned one of the dogs 133 or 134 effects the movement of valve member 123 of valve mechanism 111 to the position shown in Figure 15.

With the valve mechanism 111 in the position shown in Figure 15 the pressure in the pipe or conduit 109 is connected with the pipe or conduit 147 which in turn through the valve mechanism 113 is connected with the pipe or conduit 192 and the hollow piston rod 29. This introduces the pressure against the left hand head of the broach of the ram cylinder 27 for shifting same and therefore the ram to the left, causing the broaching tool 71 to operate on the work on work table 38. This movement of the ram continues until the cutting stroke is completed, whereupon the dog 178 on the ram through the valve shifting mechanism, including the flipper dog 175, shifts the valve member 164 to its right hand position.

The shifting of the valve member 164 to its right hand position disconnects the branch pressure pipe or conduit 189 from the pipe or conduit 191 and connects it with the pipe or conduit 190 and therefore the left hand end of the tables cylinder 56 for shifting the piston 55 therein to the right. The movement of the piston 55 to the right through the rack bar actuated thereby shifts the work tables to the opposite positions from that shown in Figure 2, that is, with the table 39 now in the cutting position and the table 38 in the retracted or work loading position. As soon as the tables are completely shifted the other of the dogs 133 and 134 reversely shift the valve member 123 of the valve mechanism 111. It will be appreciated that the shifting of the valve member 164 when the ram reached its left hand position disconnected the pressure in the pipe or conduit 109 from the pipe or conduit 147 and thereby stopped the movement of the ram in its left hand position. The shifting of the valve member 123 of the valve mechanism 111 to its left hand position connects the pressure in the pipe or conduit 109 with the pipe or conduit 148, thereby connecting the pressure through the valve mechanism 113 with the pipe or conduit 193 and hollow piston rod 30 and therefore the right hand end of the broach cylinder 27. This effects the movement of the ram 23 to the right, causing at this time the broach tool 72 to operate on the work piece on the table 39. As soon as the ram reaches its right hand position the dog 179 thereon through the flipper dog 175 shifts the valve mechanism 113 to the position shown in Figure 15, thereby connecting the pressure in branch pressure conduit 189 with the tables actuating cylinder 56 for shifting the parts to the position shown in the drawings, whereupon a repetition of the cycle just described will ensue.

As is usual, coolant is directed on the work and tool during the cutting or tooling operation and since the work tables are spaced from one another a distance, it would be impractical to have a single coolant delivery nozzle for both tables and to supply a single nozzle of a length sufficient to take care of the work on both tables would interfere with the loading of the retracted table and cause considerable splashing thereof. To overcome these objections there has been provided a pair of delivery nozzles, one for each table, together with automatic means for directing the coolant to the nozzle whose table is being utilized. The means for accomplishing this is shown in Figure 15 and comprises a coolant tank 194 which is preferably within the bed 20. Disposed adjacent the tank 194 is a circulating pump 195 having extending therefrom a suction pipe 196 which terminates in the sump or tank 194. Extending from the discharge side of the pump 195 is the pressure pipe or conduit 197 having therein a relief valve 198 which determines the pressure in the pipe or conduit 197. The pressure pipe or conduit 197 terminates in a distributor valve mechanism indicated in general in Figure 15 by the reference numeral 199.

The distributor valve mechanism 199 is shown structurally in Figure 14 and comprises a casing 200 secured as seen in Figure 3 to the inner surface of the forward wall of the bed 20. The valve casing 200 is provided with a bore therein, the opposite ends of which are closed by heads 201 and 202, the latter containing a stuffing box through which valve rod 203 passes. The valve rod 203 is provided on its inner end within the valve casing 200 with a piston valve 204 which closely hugs the wall of the bore to prevent the escape of fluid thereby. The valve casing 200 is provided with three ports—205, located substantially centrally of the length of the valve, and ports 206 and 207 disposed one on either side of the port 205 so far as the length of the casing is concerned. It is with the ports 205 that the pressure conduit 197 is connected, while the ports 206 and 207 have respectively connected therewith one end of pipes 208 and 209 which terminate as seen in Figure 1 in coolant nozzles 210 and 211 located respectively above the work tables 39 and 38.

With the piston valve 204 at one end of its movement the pipe or conduit 197 is connected with the pipe or conduit 208, while with the said valve at the other end of its movement the pipe or conduit 197 is connected with the pipe or conduit 209. In order to shift the piston valve 204 the outer end of the piston rod 203 has pinned or otherwise secured to it a finger 212 which is adapted to be engaged alternately by the dogs 133 and 134 for shifting the said valve.

The parts are so arranged that the piston valve 204 automatically contacts the proper position for connecting the coolant with the table whose work piece is being operated upon. For this reason the same dogs are utilized that are operated by the table's shifting means, therefore as the position of the tables is reversed the flow of the coolant is reversed through the nozzles 210 and 211.

Figure 8:
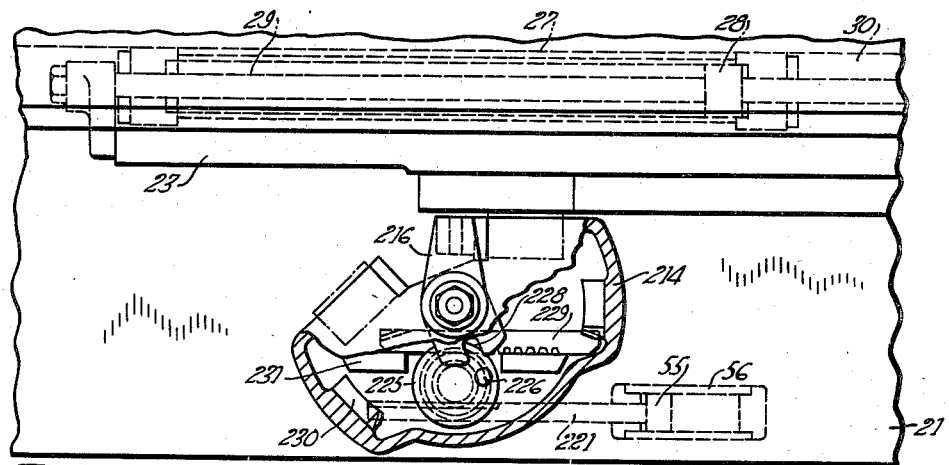
Figure 8 is a fragmentary plan view of the machine illustrating a modification in a work presenting mechanism.
Figure 9:
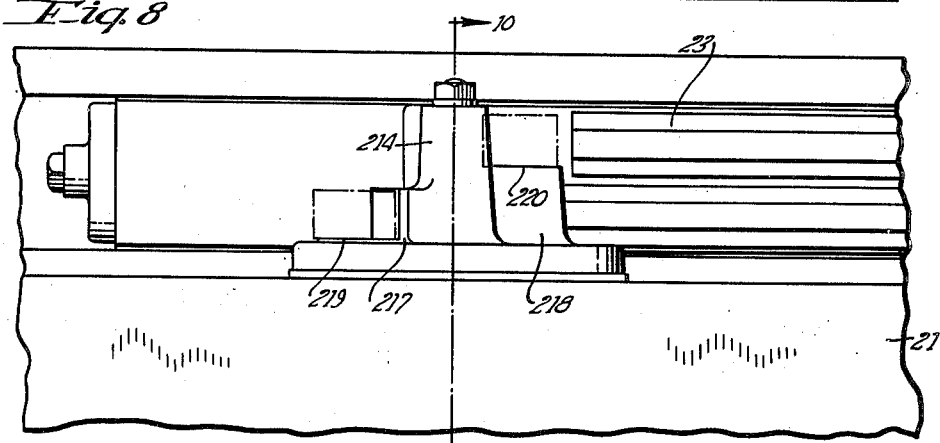
Figure 9 is an elevational view of the parts shown in Figure 8.
Figure 10:
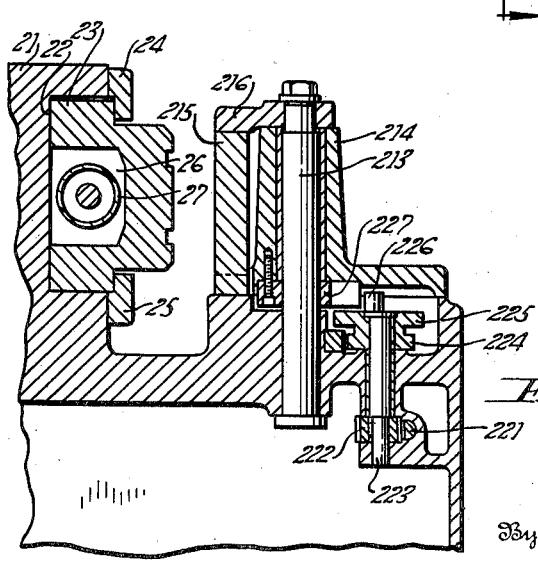
Figure 10 is a sectional view as seen from line 10—10 on Figure 9.

In Figures 8, 9 and 10 there is illustrated a modified work supporting and presenting mechanism which instead of effecting a reciprocation of the work relative to the machine oscillates a suitable carrier member. Specifically, this mechanism comprises a vertical shaft 213 which acts as a trunnion for carrier 214. The trunnion 213 is held in operative position by the bracket 215 and plate 216. The carrier 214 has in effect a pair of arms 217 and 218 projecting laterally relative thereto and upon which is formed work supporting surfaces 219 and 220 disposed at different elevations to accommodate the spacing of the broach tools 71 and 72. The arms 217 and 218 and therefore their work supporting surfaces are angularly disposed to one another as seen in Figure 8 whereby when the carrier member 214 is oscillated to one position the work on one of the supporting surfaces is adjacent the cutting tool while the other work support is retracted therefrom to permit a replacement of the work.

In order to oscillate the carrier 214 use is made of the table's moving piston and valve mechanism 55—56 for axially shifting a rack bar 221 which is slideable through suitable bearings provided by the bed 20 or a suitable bracket carried thereby. The teeth of the rack bar 221 meshes with those of a rack pinion 222 keyed or otherwise secured to a vertical shaft 223. The shaft 223 has secured to its upper end a gear 224 integral with or secured thereto a disc 225. The disc 225 has projecting therefrom an eccentric pin 226 for oscillation with the disc 225. Secured to the carrier member 214 by any desirable means is a plate 227 having formed therein a slot 228, see Figure 8, which is adapted to receive the eccentric pin 226 of the disc 225.

Meshing with the upper rack or gear 224 is a rack bar 229 adapted to lock the carrier in either of its two operative positions. For this purpose the ends of the rack bar 229 are provided with a notch to simultaneously engage the upper surface of blocks 230 carried by the member 214 and blocks 231 secured to the bed 20. It will be noted that there is lost motion between the eccentric pin 226 and the notch in the actuating plate 227 which is utilized for effecting the initial shifting of the rack bar 229, thereby unclamping the member 214 before effecting its oscillation. Also, this lost motion is employed after the member has been oscillated to effect the locking or clamping thereof.

The operation of this modified work presenting mechanism is believed obvious since a movement of the piston in one direction will rotate or oscillate the shaft 223, and therefore the disc 225 which through its pin and the slot 228 in the plate 227 effects the corresponding oscillation of the member 214 and the work pieces carried thereby. It will also be appreciated that reverse movement of the piston 55 reversely shifts the parts.

Figure 11:
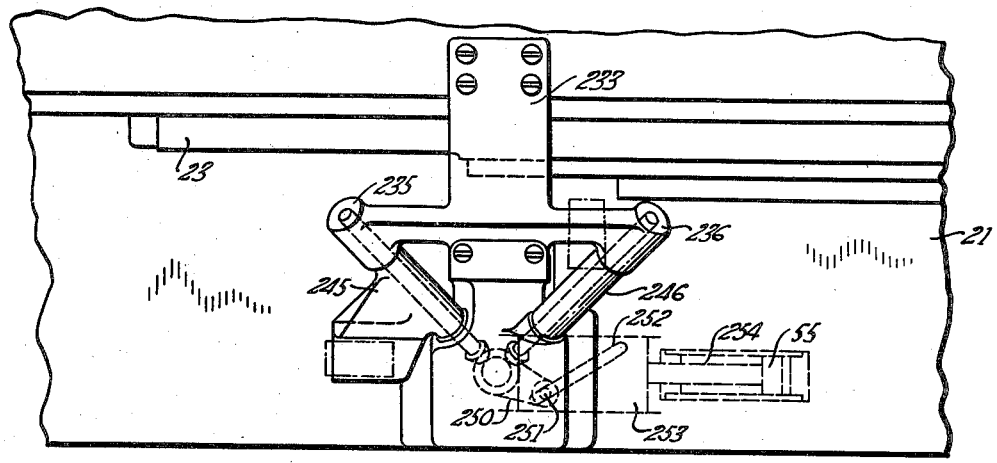
Figure 11 is a view similar to Figure 8 but showing a further modification of a work presentation mechanism.
Figure 12:
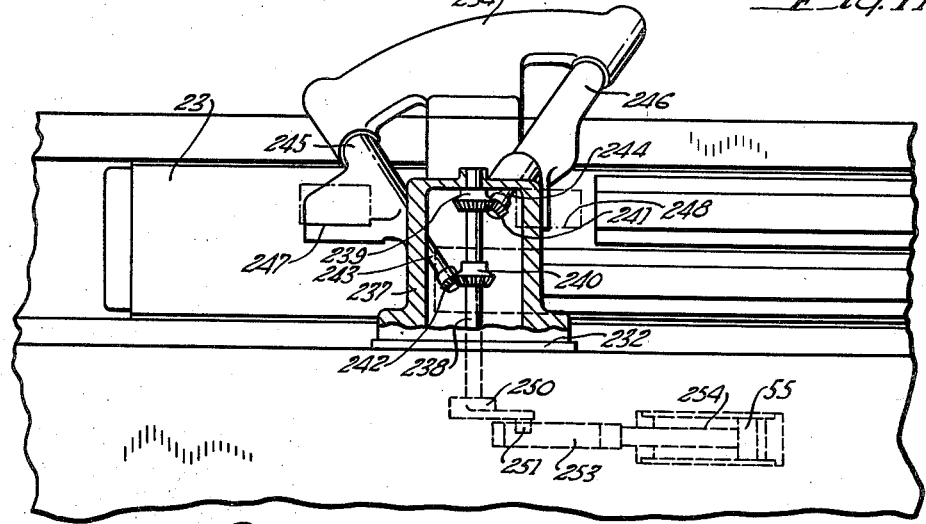
Figure 12 is an elevational view of the parts shown in Figure 11, certain of them being illustrated in cross section to more clearly disclose the construction.
Figure 13:
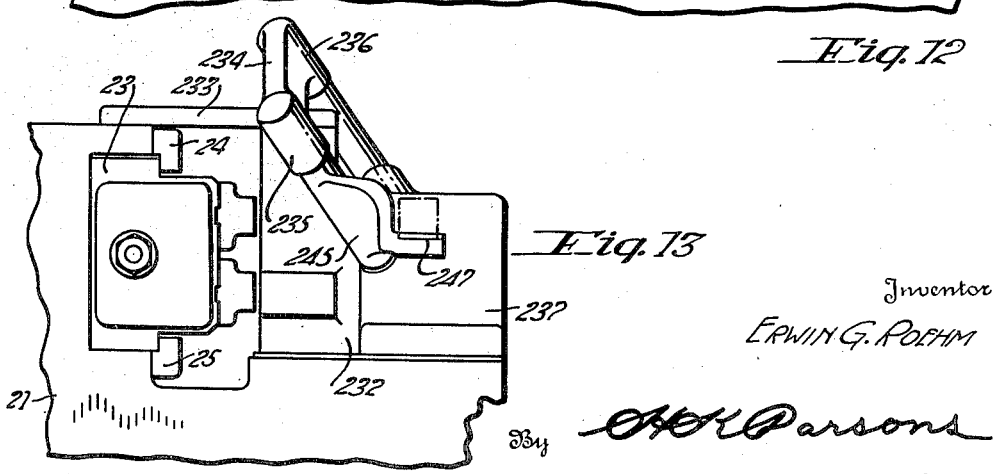
Figure 13 is a side elevational view of the parts shown in Figure 12 as seen particularly from the left hand side thereof.

In Figures 11, 12 and 13 a further modification of a work supporting and presenting mechanism is shown which is somewhat similar to the mechanism disclosed in Figures 8 to 10 inclusive.

Specifically, this mechanism comprises a bracket member 232 in the form of a standard being bolted to the bed plate 35 and further secured in position by means of a top plate 233 extending rigidly from the top of the bed column 21. The standard 232 has secured thereto a cross beam 234 provided at opposite ends with cylindrical bearings 235 and 236. Disposed on the bed plate 35 in front of the standard 232 is a gear box 237. Rotatably mounted in the box 237 is a shaft 238 having secured thereto in spaced relation bevel gears 239 and 240. The gears 239 and 240 respectively mesh with bevel pinions 241 and 242 respectively secured to the ends of shafts 243 and 244. The shafts 243 and 244 are rotatably journaled in the bearings 235 and 236, as well as suitable bearings provided by the box 237.

Each of the shafts 243 and 244 has respectively keyed to it between the beam bearings 235 and 236 and the gear box bearings a cradle arm 245 and 246. The cradle arms 245 and 246 have respectively formed thereon a work supporting surface 247 and 248 to which work pieces are bolted. Each of the arms is swingable between a loading position—that in which the arm 245 is shown in Figure 11 to an operative or cutting position, that in which 246 is shown in Figure 11. This movement or oscillation of the arms is effected by a similar oscillation of the vertical shaft 238 through the gears 239 and 240 thereon and the companion pinions on the shafts 43 and 44.

In order to oscillate the shaft 238 it has secured to its lower end an arm 250 from which depends a pin 251 adapted to enter an angular slot 252 formed in cross head 253. The cross head 253 is secured to the outer end of a piston rod 254 carrying on its inner end the tables actuating piston 55 referred to. It will be seen, as will be appreciated from Figure 11, that a movement of the piston 55 to the left correspondingly actuates the cross head 253 which through the cam slot 252 and pin 251 oscillates the shaft 238 and since the gears thereon have the pinions on opposite sides thereof they will reversely oscillate the cradle arms 245 and 246 for shifting one work piece from proximity with the broaching tools and shifting the other into proximity therewith.

From the foregoing it will be noted that there has been provided a broaching machine which effects a surface broaching operation with the ram traveling in either direction and thereby effecting the maximum production from the machine with a minimum of lost time. It will also be noted that the machine when once set in operation is automatic for alternately presenting work pieces to the broaching rams and automatically reversing the movement of the rams.

What is claimed is:

1. In a machine tool organization the combination of a bed, a tool ram mounted thereon for reciprocation in opposite directions and supporting a pair of oppositely disposed broaches shiftable by the ram for performance of a cutting operation whereby one is operable when the ram is moving in one direction and the other is operable when the ram is moving in the other direction, a work supporting mechanism adapted to support a pair of work pieces and means to shift said work supporting mechanism for alternately presenting said work pieces to the broaches as the broaches are moved in opposite directions.

2. In a broaching machine of the class described the combination of a bed, a broach ram mounted thereon for translation in opposite directions, a pair of broaching tools secured to the ram with their broach teeth oppositely disposed as respects the stroke of the broach and alternately operative when the ram is translated in opposite directions, a pair of work supports each having a position remote from the ram and a position adjacent thereto, and automatic means for simultaneously shifting one work support to its remote inoperative position and the other to its operative position whereby a work piece is being operated upon during opposite translations of the ram.

3. In a broaching machine of the class described the combination of a bed, a broach ram mounted thereon for translation in opposite directions, a pair of broaching tools secured to the ram with their broach teeth oppositely disposed as respects the stroke of the broach and alternately operative when the ram is translated in opposite directions, a pair of work supports each having a position remote from the ram and a position adjacent thereto, automatic means for simultaneously shifting one work support to its remote inoperative position and the other to its operative position whereby a work piece is being operated upon during opposite translations of the ram, and automatic means for reversely translating the broach and alternately, simultaneously shifting the work supports.

4. In a broaching machine of the class described the combination of a bed, a broach ram mounted thereon for translation in opposite directions, a pair of broaching tools secured to the ram and oppositely disposed whereby they alternately have a tooling movement when the ram is translated in opposite directions, a pair of work supports each having a position remote from the ram and a position adjacent thereto, automatic means for simultaneously shifting one work support to its remote inoperative position and the other to its operative position whereby a work piece is being operated upon during opposite translations of the ram, automatic means for reversely translating the broach and alternately, simultaneously shifting the work supports, and means interlocking the ram actuating means and work supports actuating means whereby their operation is effected in sequential order.

5. In a broaching machine of the class described the combination of a bed, a ram mounted on said bed for translation through a cutting stroke in one direction and translation in a reverse direction through a cutting stroke, a hydraulic motor for effecting the reverse translations of the broach ram, a pair of work supporting tables, one having a position remote from the ram and the other having a position adjacent the ram when the ram is traveling in one direction and each having the opposite position when the ram is traveling in the other direction, and means for effecting the simultaneous positioning of the work tables prior to each reversal of the ram.

6. In a broaching machine of the class described the combination of a bed, a ram mounted on said bed for translation through a cutting stroke in one direction and translation in a reverse direction through a cutting stroke, an hydraulic motor for effecting the reverse translations of the broach ram, a pair of work supporting tables, one having a position remote from the ram and the other having a position adjacent the ram when the ram is traveling in one direction and each having the opposite position when the ram is traveling in the other direction, means for effecting the simultaneous positioning of the work tables prior to each reversal of the ram, including an hydraulic motor.

7. In a broaching machine of the class described the combination of a bed, a ram mounted on said bed for translation through a cutting stroke in one direction and translation in a reverse direction through a cutting stroke, an hydraulic motor for effecting the reverse translations of the broach ram, a pair of work supporting tables, one having a position remote from the ram and the other having a position adjacent the ram when the ram is traveling in one direction and each having the opposite position when the ram is traveling in the other direction, means for effecting the simultaneous positioning of the work tables prior to each reversal of the ram including an hydraulic motor, an hydraulic circuit for actuating the ram and table motors, and means for alternately connecting the hydraulic circuit with the ram motor and tables actuating motor.

8. In a broaching machine of the class described the combination of a bed, a ram mounted on said bed for translation through a cutting stroke in one direction and translation in a reverse direction through a cutting stroke, an hydraulic motor for effecting the reverse translations of the broach ram, a pair of work supporting tables, one having a position remote from the ram and the other having a position adjacent the ram when the ram is traveling in one direction and each having the opposite position when the ram is traveling in the other direction, means for effecting the simultaneous positioning of the work tables prior to each reversal of the ram including an hydraulic motor, an hydraulic circuit for actuating the ram and table motors, means for alternately connecting the hydraulic circuit with the ram motor and table actuating motor including a pair of valves one of which is controlled by the ram for effecting the operation of the table motor while the other is actuated by the tables for controlling the operation of the ram motor.

9. In a broaching machine of the class described the combination of a bed, a ram mounted thereon for reciprocation relative thereto in opposite directions, a pair of broaching tools secured to said ram, one operation when the ram is moving in one direction and the other operable when the ram is moving in the other direction, a hydraulic motor for actuating the ram, a work supporting mechanism for presenting a work piece to each of said tools when traveling through its cutting stroke, a second hydraulic motor for actuating the work supporting mechanism, a hydraulic circuit for actuating said hydraulic motors including a pair of valves one operable by the ram at each end of its reciprocatory stroke to effect the operation of the work supporting motor and the other operable by the work support to effect the operation of the broach motor.

10. In a broaching machine of the class described the combination of a bed, a ram mounted thereon for reciprocation relative thereto in opposite directions, a pair of broaching tools secured to said ram, one operable when the ram is moving in one direction and the other operable when the ram is moving in the other direction, an hydraulic motor for actuating the ram, a work supporting mechanism for presenting a work piece to each of said tools when traveling through its cutting stroke, a second hydraulic motor for actuating the work supporting mechanism, an hydraulic circuit for actuating said hydraulic motors including a pair of valves one operable by the ram at each end of its reciprocatory stroke to effect the operation of the work supporting motor and the other operable by the work support to effect the operation of the broach motor, and a starting and stopping valve in the hydraulic circuit for controlling the flow therethrough.

11. In a broaching machine the combination of a bed, a broach ram mounted on the bed for translation relative thereto, an hydraulic motor for effecting the translation of the ram in opposite directions, a first cutting tool secured to the broach ram and movable through a cutting stroke thereby on movement of the ram in one direction, a second cutting tool secured to the broach ram and movable through a cutting stroke thereby upon movement of the ram in the opposite direction, a work supporting mechanism adapted when in one position for presenting a first work piece to the first tool while being actuated through its cutting stroke and for supporting a second work piece for presentation to the second tool while being actuated through its cutting stroke in the opposite direction, and means for effecting the operation of the work supporting mechanism alternately to present the work pieces in operative relation to their respective tools.

12. In a broaching machine the combination of a bed, a broach ram mounted on the bed for translation relative thereto, an hydraulic motor for effecting the translation of the ram in opposite directions, a first cutting tool secured to the broach ram and movable through a cutting stroke thereby, a second cutting tool secured to the broach ram and movable through a cutting stroke thereby, a work supporting mechanism adapted when in one position for presenting a first work piece to the first tool while being actuated through its cutting stroke and for supporting a second work piece for presentation to the second tool while being actuated through its cutting stroke, means for effecting the operation of the work supporting mechanism, and means for interlocking the ram actuating means and the work support actuating means whereby they are operated in timed sequence.

13. In a broaching machine of the class described the combination of a bed, of a broach ram mounted thereon for translation relative thereto, a first cutter secured to the ram and operable during the movement of the ram through a cutting stroke, a second cutter secured to the ram and operable through a cutting stroke, a work supporting mechanism adapted to support a first work piece for presentation to the first cutter while moving through its cutting stroke and adapted to support a second work piece for presentation to the second cutter while moving through its cutting stroke, and automatic means operable by the ram and work supporting mechanism for shifting the work support to present the first work piece to its cutter and initiate a movement of the ram, stop the movement of the ram and actuate the work support to present the second work piece to the second cutter, and again initiate a movement of the ram.

14. In a broaching machine of the class described the combination of a bed, of a broach ram mounted thereon for translation relative thereto, a first cutter secured to the ram and operable during the movement of the ram through a cutting stroke, a second cutter secured to the ram and operable through a cutting stroke, a work supporting mechanism adapted to support a first work piece for presentation to the first cutter while moving through its cutting stroke and adapted to support a second work piece for presentation to the second cutter while moving through its cutting stroke, automatic means operable by the ram and work supporting mechanism for shifting the work support to present the first work piece to its cutter and initiate a movement of the ram, stop the movement of the ram and actuate the work support to present the second work piece to the second cutter, and again initiate a movement of the ram, including an independent hydraulic motor for the ram and work support, an hydraulic circuit for actuating the motors, and a pair of reversing valves one for each of the motors and respectively actuated by the ram for controlling the operation of the work support and by the work support for controlling the operation of the ram.

15. In a broaching machine of the class described the combination of a bed, of a broach ram mounted thereon for translation relative thereto, a first cutter secured to the ram and operable during the movement of the ram through a cutting stroke, a second cutter secured to the ram and operable through a cutting stroke, a work supporting mechanism adapted to support a first work piece for presentation to the first cutter while moving through its cutting stroke and adapted to support a second work piece for presentation to the second cutter while moving through its cutting stroke, automatic means operable by the ram and work supporting mechanism for shifting the work support to present the first work piece to its cutter and initiate a movement of the ram, stop the movement of the ram and actuate the work support to present the second work piece to the second cutter, and again initiate a movement of the ram, including an independent hydraulic motor for the ram and work support, an hydraulic circuit for actuating the motors, a pair of reversing valves one for each of the motors and respectively actuated by the ram for controlling the operation of the work support and by the work support for controlling the operation of the ram, and a starting and stopping valve in the hydraulic circuit for initiating and stopping the flow therein to correspondingly initiate and stop the operation of the machine.

16. In a broaching machine of the class described the combination of a bed, of a broach ram mounted thereon for translation relative thereto, a first cutter secured to the ram and operable during the movement of the ram through a cutting stroke, a second cutter secured to the ram and operable through a cutting stroke, a work supporting mechanism adapted to support a first work piece for presentation to the first cutter while moving through its cutting stroke and adapted to support a second work piece for presentation to the second cutter while moving through its cutting stroke, automatic means operable by the ram and work supporting mechanism for shifting the work support to present the first work piece to its cutter and initiate a movement of the ram, stop the movement of the ram and actuate the work support to present the second work piece to the second cutter, and again initiate a movement of the ram, including an independent hydraulic motor for the ram and work support, an hydraulic circuit for actuating the motors, a pair of reversing valves one for each of the motors and respectively actuated by the ram for controlling the operation of the work support and by the work support for controlling the operation of the ram, a starting and stopping valve in the hydraulic circuit for initiating and stopping the flow therein to correspondingly initiate and stop the operation of the machine, and a coolant distribution system for automatically directing coolant to the cutter passing through its cutting stroke.

17. A broaching machine including a bed, a broaching ram supported by the bed for translation relative thereto, a pair of work supports carried by the bed and alternately movable in a direction toward and from the ram, a pair of oppositely disposed broaches carried by the ram and both laterally and longitudinally off-set with respect to each other an amount corresponding to the off-set relationship of the pair of work supports, and means for alternately imparting a feeding movement in opposite directions to the ram and its associated broaches whereby a substantially continuous broaching is effected on successive work pieces, substantially as described.

18. A broaching machine of the character described including a bed and a ram reciprocable on the bed, a pair of staggered oppositely disposed broaches carried by the ram and reciprocable therewith, means for supporting a pair of work pieces in staggered offset relation in correspondence with the relationship of the broaches, and means for alternately moving an individual work support into position for operative engagement of a work piece thereon by an individual broach during its cutting stroke and for retracting the same out of the path of broach movement during the non-cutting stroke of the broach.

19. A broaching machine of the character described including a bed and a ram reciprocable on the bed, a pair of staggered oppositely disposed broaches carried by the ram and reciprocable therewith, means for supporting a pair of work pieces in staggered offset relation in correspondence with the relationship of the broaches, means for alternately moving an individual work support into position for operative engagement of a work piece thereon by an individual broach during its cutting stroke and for retracting the same out of the path of broach movement during the non-cutting stroke of the broach, and means operable by movement of an individual work piece into tooling position for initiating a tooling movement of the associated broach with respect thereto.

20. In a broaching machine of the character described, the combination with a reciprocable broach ram, of means for effecting a reciprocation thereof in opposite directions and at a tooling rate in both directions, a pair of oppositely disposed broaches carried by the ram, whereby one of said broaches may effect a tooling operation during each direction of movement of the ram, a pair of work supporting members having work support portions extending into alignment with the respective broaches on the ram for individual presentation of work pieces to the respective broaches, means supporting said members for movement toward and from the broaches on the ram, means interconnecting said members whereby one of said members is retracted with respect to the ram as the other member is moved toward the ram, locking devices for securing said members in operative relation to the ram, and a control mechanism including an hydraulic motor and power connections between the hydraulic motor and the locking devices and between the hydraulic motor and the member shifting means, whereby actuation of the motor will successively release the locking devices and alternately shift the work supporting members.

ERWIN G. ROEHM.